Patented Nov. 10, 1936

2,060,581

UNITED STATES PATENT OFFICE 2,060,581

METHOD FOR TREATING COCOA BEANS

Alfred Laessig, Halle on the Saale, Germany

Application February 5, 1934, Serial No. 709,888
In Germany February 18, 1933

4 Claims. (Cl. 99—23)

The object of my present invention is to provide a method for treating cocoa beans with hot air in order to roast or to dry the beans.

According to my invention the beans are dried or roasted in a drying device provided with louvre surfaces disposed at relative angles and open at the sides.

These louvre plates of the dryer distribute the beans in the form of a thin and open layer, so that they can be well aerated for the purpose of drying and oxidizing or roasting. The beans are dried or roasted by a current of hot air generated by an air heater. The intake for the fresh air supplied to the heater opens into one or more of the lower sets of louvres thus cooling the hot beans in addition to preheating the incoming fresh air.

In order to obtain a further improvement an apparatus for fermentation, oxidation and drying of cocoa beans shall be so designed that it enables operations to be conducted in a continuous manner.

Figure 1:
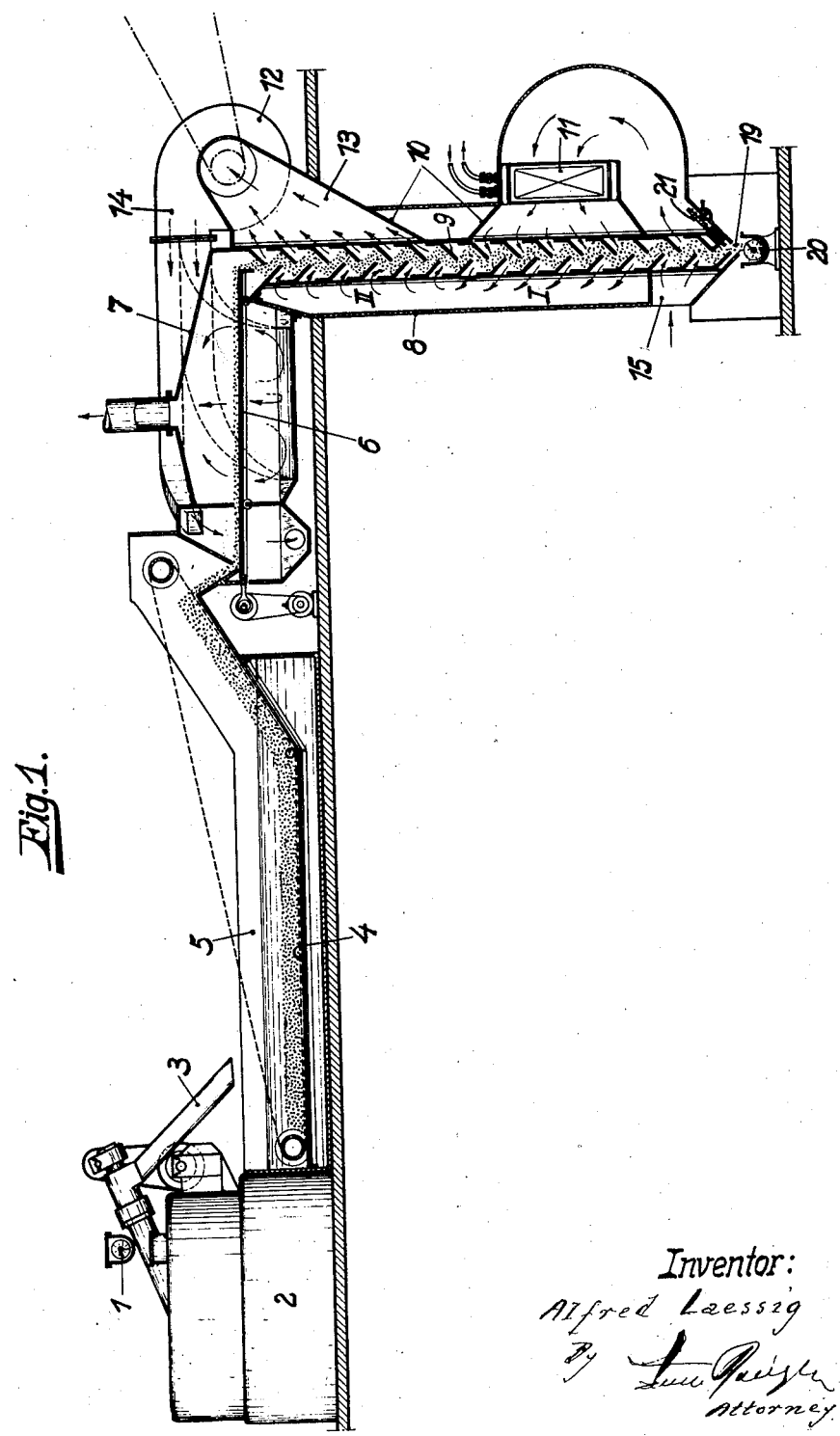
Figure 2:
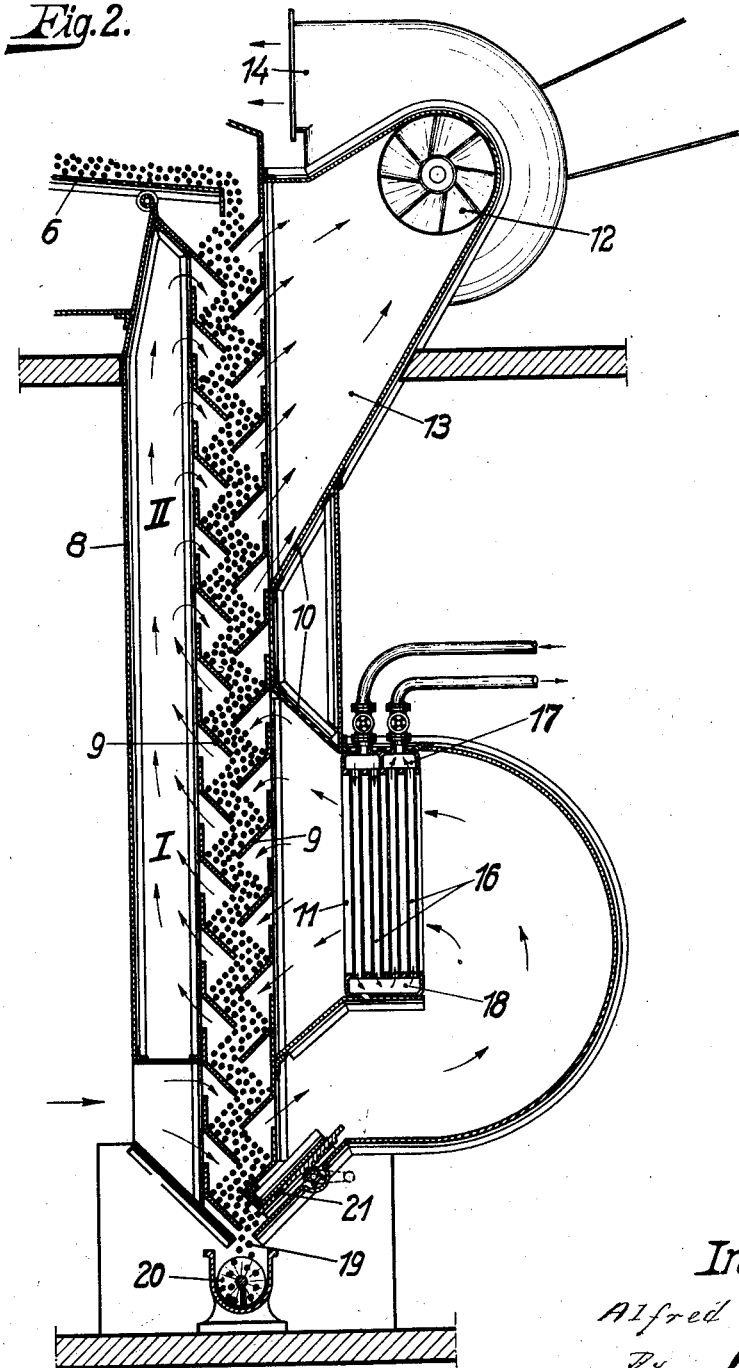

Apparatus according to the invention is shown by way of example in the accompanying drawings in which:

Fig. 1 is a sectional elevation of a complete plant for the preparation of cocoa beans, Fig. 2 is a vertical sectional view of the dryer on a larger scale.

In the apparatus according to Figure 1, the cocoa beans to be improved are fed continuously by a worm 1, to a washing machine 2 from which they pass through a shute 3, onto a travelling lattice belt 4 running at a low speed in a tank 5 charged with a fermentation liquid, and in such a manner that the beans remain in the tank 5 for one to three hours, to ensure thorough steeping. Keeping the beans in the liquid for a longer period is unfavourable because, in such case, exosmosis, and therefore lixiviation of the beans, is liable to occur.

Near the end of the fermentation tank, the belt is led obliquely upwards and then discharges the fully steeped beans onto a shaker sieve 6 located in an aeration vessel 7.

This sieve 6 delivers the beans into a louvre dryer which consists of a vertical dryer casing 8 provided with louvre surfaces 9, which are disposed in angular relation to one another and are open at the sides. The beans leaving the aeration vessel pass slowly down between these louvre plates 9, which distribute the beans in the form of a thin and loose layer so that they can be well aerated for the purpose of drying or roasting.

The dryer casing 8 is divided by transverse walls 10 into the heating stages I and II. The beans are dried by means of hot air generated in the heater 11 and admitted first in the bottom stage I, which in the drawings is traversed from right to left by the air current. In the succeeding stage II the air flows from left to right. The air is moved by the fan 12 which draws it out of the stage II by way of the pipe 13 and discharges it through the conduit 14.

The two-stage louvre dryer operates on the counterflow principle inasmuch as the already pre-dried beans in the stage I come into contact with the hottest and driest air, while the still damp beans in the stage II encounter air that has already been cooled and moistened in stage I.

The intake 15 for the fresh air supplied to the heating apparatus 11 of the dryer opens into one or more of the lower sets of the louvre plates 9, thus cooling the hot beans in addition to preheating the incoming fresh air.

The air-heater, which may be used, has a nest of tubes 16, the end portions of which are fitted into end-chambers 17 and 18 respectively.

The most suitable temperature for this drying with warm air lies between 72° C. and 74° C.

The dryer is connected with the aerating vessel 7 by means of the conduit 14, so that the warm air leaving the dryer is fed to the shaker sieve 6, where it passes transversely through the layer of beans in the direction indicated by the arrows.

A special advantage of this aeration apparatus consists in that the oxidation process requires only a very short time for completion. Given a shallow layer (for example 15–20 mm.) of beans and a shaker sieve about 2 metres wide, the aerating process is complete in about 15 minutes.

The dryer is provided with an outlet 19 for the dried and cooled beans, which then are passed by a worm 20 to a cracking and husking mill not shown in the drawings. The outlet 19 is provided with a regulating damping device 21.

I claim:

1. A method of treating cocoa beans which comprises the continuous and successive steps of steeping the beans in a fermentation liquid, aerating and shaking the wet beans during horizontal travel in a thin layer on a shaker sieve to complete the oxydation of the beans, and then submitting the beans to a three-stage drying and roasting in a louvre dryer during substantial vertical and constant rolling travel in which in the first stage after the beans are aerated the beans are treated by hot air, in the second stage they are treated with hot air at a higher temperature than the preceding, and in the third stage the beans are cooled by air at room temperature.

2. A method according to claim 1, in which the three-stage drying and roasting is carried out by forcing the air through and around the beans at angles relative to the vertical travel of the beans.

3. A method according to claim 1, in which the three-stage drying and roasting is carried out by forcing the air through and around the beans at angles relative to the vertical travel of the beans and in which the air enters at the third stage, is preheated just before entering the second stage, passes then through the first stage and finally through the beans in the aeration and shaking step.

4. A method of treating cocoa beans which comprises a continuous and successive step of washing the beans, steeping the beans in a fermentation liquid by slowly drawing the beans through the liquid on a traveling belt, aerating and shaking the wet beans during horizontal travel in a thin layer on a shaker sieve to complete the oxydation of the beans, and then submitting the beans to a three-stage drying and roasting in a louvre dryer during substantial vertical and constant rolling travel in which in the first stage after the beans are aerated the beans are treated by hot air, in the second stage they are treated with hot air at a higher temperature than the preceding, and in the third stage the beans are cooled by air at room temperature.

ALFRED LAESSIG.